Oct. 5, 1965  P. W. HARLAND ETAL  3,209,599
SAFETY LENS FOR PRESSURE GAUGE
Filed Sept. 17, 1963
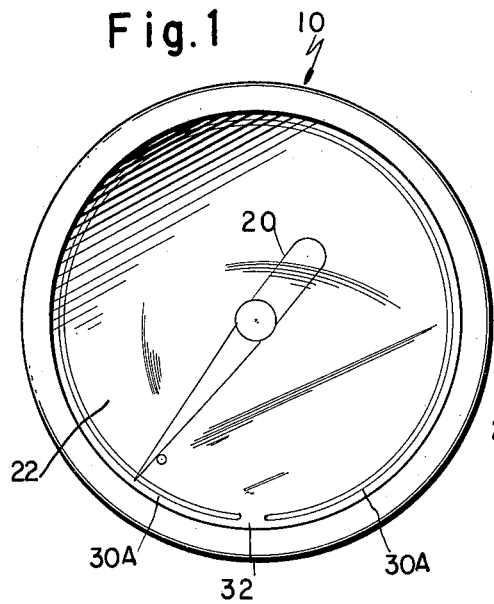
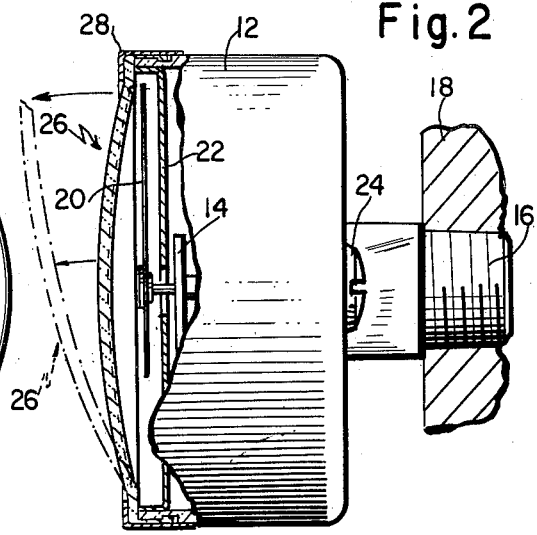
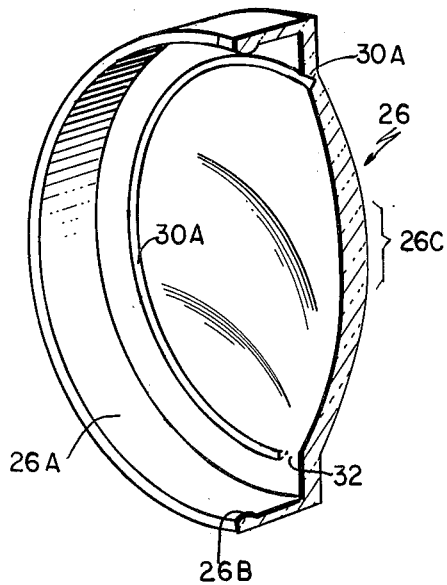
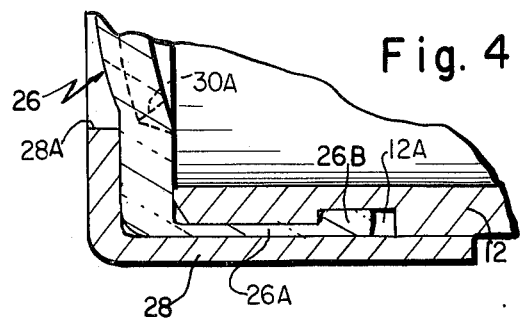
INVENTORS.
PHILIP W. HARLAND
CHARLES J. BEER
BY JAMES D. FULMER
*Robertson & Smythe*
ATTORNEYS United States Patent Office
3,209,599
Patented Oct. 5, 1965

3,209,599
SAFETY LENS FOR PRESSURE GAUGE
Philip W. Harland, Perkasie, Charles J. Beer, Sellersville, and James D. Fulmer, Quakertown, Pa., assignors to Ametek, Inc., New York, N.Y., a corporation of Delaware
Filed Sept. 17, 1963, Ser. No. 309,522
6 Claims. (Cl. 73—431)

This invention relates in general to a pressure gauge construction and in particular to a safety lens for the face of such gauge.

Pressure tight casing gauges present a hazard because, if the primary element, such as a Bourdon tube, breaks or leaks, excessive pressure in the casing may blow out the crystal or lens of the gauge. In such an event, the crystal could injure those in the vicinity.

One of the objects of the invention is to provide a crystal for a gauge which will safely relieve excess pressure in the casing.

In one aspect of the invention, a safety lens is provided for a pressure gauge, the lens being made of clear plastic with its edges adapted to be held in a hermetic or tight seal to the case of the gauge. The lens has a weakened section of diminished cross section or cross section of less thickness than the remainder of the crystal. The weakened section may be along a line which forms a nearly closed geometric figure which may have a non-closed portion between the ends of the line of the diminished cross section, the non-closed portion having full lens thickness. Such a lens, when subjected to overpressure, will fracture first at some part of the weakened portion along the line that forms a geometric figure so that the portion blown out will remain held in place by the full section non-closed portion and/or other portions of the lens or will break away at the weakened portion to relieve pressure in the gauge without shattering.

The non-closed ring preferably is positioned adjacent the periphery of the lens so as to not interfere with the viewing of the gauge face.

Other advantages, objects and features obtained by use of the invention will be apparent from the following description and drawings which are merely exemplary.

In the drawings:

FIG. 1 is a front view of a gauge embodying the present invention;

FIG. 2 is a side partly in section of the gauge of FIG. 1;

FIG. 3 is a perspective rear view of a gauge lens, partly in section; and

FIG. 4 is a fragmentary enlarged section showing the details of the lens sealed to the casing.

Gauge 10 may comprise a pressure sealed casing or housing 12 in which there is some form of primary or pressure element connected to movement 14, the pressure element being adapted to be affixed by a fitting or socket 16 to a source of pressure, such as pressure container 18. The primary element may be a conventional Bourdon tube (not shown) or other pressure responsive means. The pressure containing device 18 is usually one in which the fluid within the container can have its state, condition or quantity determined by the primary element 14. The movement 14 is arranged with a pointer 20 which, in conjunction with indicia on the face of a gauge face 22, will indicate the condition within the pressure container 18. The movement 14 may be secured within the casing 12 by machine screws 24 on either side of the fitting 16 so that there is a hermetic seal between the casing and the socket or fitting.

At the face of gauge 10 is located a lens 26. The edges of the lens are held in a hermetically sealed condition with the case 12, as for example, by a case seal ring 28. As the lens 26 is generally disc shaped, it has skirt-like edges 26A which have been turned to form a cap for the cylindrical sides of the casing 12. At the very end of the edges 26A there is formed a protuberance 26B arranged to fit into a circumferential slot 12A in casing 12. Thus, when the sealing ring 28 is placed in position, it clamps the disc shaped lens 26 so that the lens may be hermetically sealed to the case 12 by the compression in the plastic lens and particularly in protuberance 26B as shown in FIG. 4.

If the primary element leaks or breaks, the interior of the gauge 10 may hold for awhile, at least, the pressure to which it is exposed. In order to prevent possible damage from flying fragments, should the lens or crystal 26 be blown out by an overpressure exisiting in the gauge, the disc shaped crystal 26 is arranged with a weakened section of diminished cross section 30 along a line which forms a nearly closed geometric figure (FIGS. 1 and 2). The diminished cross section 30 is illustrated as being a V-shaped 30A and extending nearly the entire circumference or periphery of the lens immediately adjacent the inner edges 28A. However, there remains a small non-closed portion 32 (FIG. 1) of the lens between the ends of the weakened section 30 where the section of the lens is of full thickness. A lens of this configuration, in addition to its obviously desirable stress characteristics, is coincidentally readily moldable by present techniques. The non-closed geometric figure may take other forms than that illustrated herein.

In the form shown, when an overpressure exists in the interior of the gauge 10, the failure of the lens will take place first at the weakened section 30A. Should this occur, at least a part of the weakened section 30A will fail and some part, and perhaps all, of the circumscribed portion of the lens 26 will be blown outwardly (FIG. 2), while being held attached to the gauge by the bending without fracture which takes place at the non-closed portion 32 of the lens. The lens will not necessarily bend out because breaking along the weakened section immediately releases pressure.

Preferably, the lens 26, has a convex portion 26C in the center as to make the viewing of the gauge face 22 more clear without reflections. It also will provide an inner section at the periphery of the edges of the convex section with the relatively flat portion of the lens where it is joined to the casing 12A (FIGS. 4, 5). The weakened section 30A is located adjacent the periphery of the convex portion in such a position as not to interfere with the reading of the gauge face. At the same time, it will provide a weakened section at the point where stresses are likely to be highest when overpressure occurs.

It will be understood that changes may be made in the form or various details of construction without departing from the spirit of the invention except as defined in the appended claims.

What is claimed is:

1. In a gauge having a primary element exposed to pressure when said gauge is in a substantially pressure tight case, the combination including a pressure sealed case containing said primary element, a clear plastic lens covering a face of said case and hermetically sealed thereto, said lens being generally disc-shaped and having a weakened section, the thickness of said weakened section being reduced along a ring shaped line portion, said ring shaped line being positioned adjacent the periphery of said lens, whereby upon an overpressure due to a leak of pressure into said casing from said primary element, the weakened section will fracture and relieve pressure within the casing.

2. In a gauge having a primary element exposed to pressure when said gauge is in a substantially pressure tight case, the combination including a pressure sealed case containing said primary element, a clear plastic lens covering a face of said case and hermetically sealed thereto, said lens being generally disc-shaped with a convex center portion and having a weakened section, the thickness of said weakened section being reduced along a ring shaped line portion, said ring shaped line being positioned adjacent the periphery of said lens, whereby upon an overpressure due to a leak of pressure into said casing from said primary element, the weakened section will fracture and relieve pressure within the casing.

3. In a gauge having a primary element exposed to pressure when said gauge is affixed in a substantially pressure tight case, the combination including a pressure sealed case containing said primary element, and a clear plastic lens covering a face of said case and hermetically sealed thereto, said lens being generally disc-shaped with a convex center portion and having a weakened section at the periphery of the convex center portion along a line to form a non-closed ring, the thickness of said weakened section being reduced along the line of the non-closed ring and full in the non-closed portion, said ring being positioned adjacent the periphery of said lens, whereby upon an overpressure due to a leak of pressure into said casing from said primary element, the weakened section will fracture and at least some portion of the lens will relieve pressure while being held by said full thickness section.

4. In a gauge having a primary element exposed to pressure when said gauge is in a substantially pressure tight case, the combination including a pressure sealed case containing said primary element, and said case having a circumferential groove in the exterior side walls thereof, a clear plastic lens covering a face of said case and hermetically sealed thereto, said lens being generally disc-shaped and having a weakened section, the thickness of said weakened section being reduced along a ring shaped line portion, said ring shaped line being positioned adjacent the periphery of said lens, said lens having a depending side wall with a circumferential interior lip engageable in said groove, and rings means slippable over the edges of said casing along said side wall forcing said lip into said groove and holding said lens in sealed assembled relation, whereby upon an overpressure due to a leak of pressure into said casing from said primary element, the weakened section will fracture and relieve pressure within the casing.

5. In a gauge, a casing having a back wall surrounded by a side wall, there being a gauge movement mounted on said back wall and having a fitting extending through said back wall in a hermetically sealed fashion, the combination with said casing of a clear plastic lens forming the front wall of said casing and hermetically sealed thereto, said lens being generally disc-shaped and having a weakened section, the thickness of said weakened section being reduced along a ring-shaped line portion, said ring-shaped line being positioned adjacent the periphery of said lens, a skirt portion integral with said lens and adapted slidingly to fit over the side wall of said casing, and ring means slidable over said skirt to provide a hermetical seal between said skirt and said side wall of said casing.

6. In a gauge, a casing having a back wall surrounded by a side wall having a circumferential groove on the exterior surface thereof, there being a gauge movement mounted on said back wall and having a fitting extending through said back wall in a hermetically sealed fashion, the combination with said casing of a clear plastic lens forming the front wall of said casing and hermetically sealed thereto, said lens being generally disc-shaped and having a weakened section, the thickness of said weakened section being reduced along a ring-shaped line portion, said ring-shaped line being positioned adjacent the periphery of said lens, and a skirt portion integral with said lens including a circumferential bead on the inner surface of said skirt portion, said skirt portion being adapted slidingly to fit over the side wall of said casing such that said bead is received within said groove.

References Cited by the Examiner

UNITED STATES PATENTS

| | | | |
|---|---|---|---|
| 1,488,034 | 3/24 | Crocker et al. | 73—416 |
| 2,548,744 | 4/51 | Simms | 220—89 |
| 2,656,950 | 10/53 | Coffman | 220—89 |
| 2,693,896 | 11/54 | Brown. | |
| 2,778,525 | 1/57 | Lermer | 220—60 |
| 3,055,536 | 9/62 | Dienz | 220—60 |

RICHARD C. QUEISSER, *Primary Examiner.*